J. R. WINKLE.
JOINTED ROTARY VALVE.
APPLICATION FILED MAY 29, 1914.
1,259,063.
Patented Mar. 12, 1918.
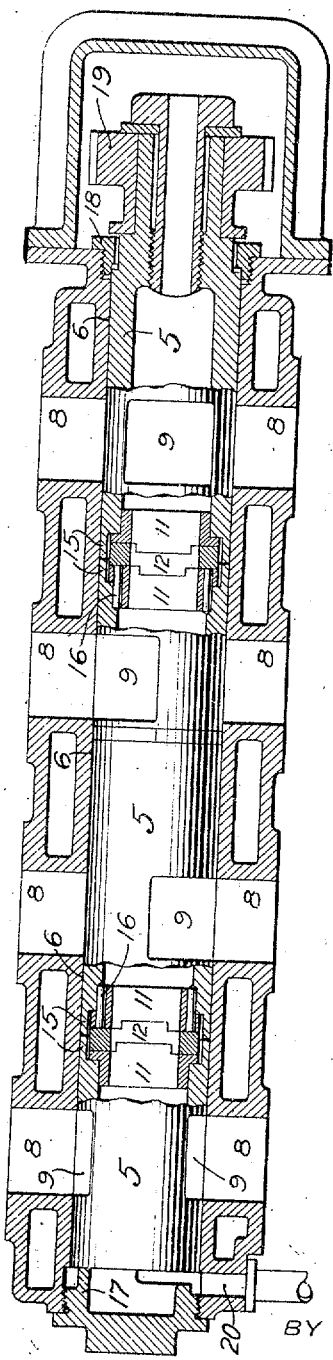
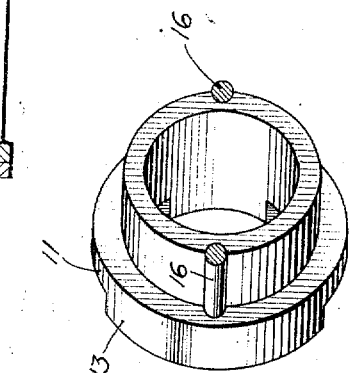
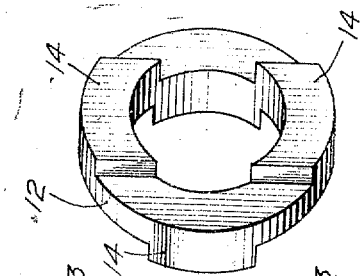
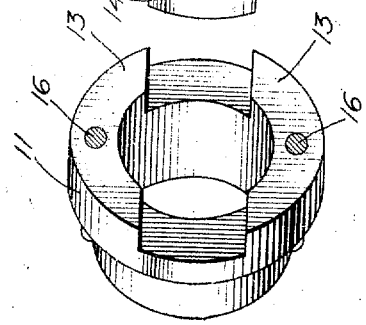
WITNESSES
INVENTOR.
John R. Winkle
BY
HIS ATTORNEY IN FACT

UNITED STATES PATENT OFFICE.

JOHN R. WINKLE, OF SWISSVALE, PENNSYLVANIA, ASSIGNOR TO WESTINGHOUSE ELECTRIC & MANUFACTURING COMPANY, A CORPORATION OF PENNSYLVANIA.

JOINTED ROTARY VALVE.

1,259,063.   Specification of Letters Patent.   Patented Mar. 12, 1918.

Application filed May 29, 1914. Serial No. 841,800.

*To all whom it may concern:*

Be it known that I, JOHN R. WINKLE, a citizen of the United States, and a resident of Swissvale, in the county of Allegheny and State of Pennsylvania, have made a new and useful Invention in Jointed Rotary Valves, of which the following is a specification.

This invention relates to valves for internal combustion engines and has for an object to produce an improved rotary valve which eliminates the difficulties encountered with valves of that type when employed in connection with multi-cylinder internal combustion engines.

A further object is to produce an articulate valve having improved means for securing the separate sections of the valve together. These and other objects I attain by means of a valve embodying the features herein described and illustrated in the drawings accompanying and forming a part of this application.

In the drawings, Figure 1 is a longitudinal section of a valve casing shown in connection with a valve embodying my invention. For convenience of illustration portions of the valve are shown as if broken away.

Figs. 2 and 3 are perspective views of coupling members which form details of the valve illustrated as an embodiment of my invention.

Fig. 4 is a perspective view of a coupling disk or ring which also forms a detail of the illustrated valve and which coöperates with coupling members in holding the separate sections of the assembled valve in place.

The valve illustrated as an embodiment of my invention is adapted to control the delivery of combustible charge to, and the discharge of burned gases from all of the cylinders of a multi-cylinder internal combustion engine, and it is adapted to be journaled in a valve casing having a plurality of alined bearing faces, which may be located between ports formed in the casing. It is difficult, and from a practical standpoint almost impossible, to so construct the bearings for a long cylindrical rotary valve that they will maintain an exact alinement during the operation of the engine. Even where the cylinders of the engine and the valve casing are cast *en bloc* and all of the bearings for the valve are bored in one continuous operation, inequalities in the alinement of the bearings will result either from a lack of exactness in the boring operation or from variations in temperature strains in the metal of the different cylinders. Where the difficulties resulting from a misalinement of the bearings are aggravated by inaccuracies in shape of the valve itself, the sticking of the valve is apt to render it inoperative or at least to prove highly objectionable and to finally result in damage to the valve itself or to the valve casing. One of the principal objects of my present invention is to produce an improved articulate valve which will overcome the difficulties above enumerated and which will not of itself give rise to other difficulties.

The valve illustrated is made up of tubular sections 5 so arranged that when assembled they form a long tubular or cylindrical valve which is capable of rotating in a continuous bearing having a plurality of bearing surfaces 6, formed within the valve casing 7. The valve casing is shown as provided with ports 8—8, and bearing surfaces 6 are located between each set of ports. Each section 5 is preferably of such length that it bridges at least one set of the ports 8 and engages bearing surface on each side of the ports. As shown each valve section is provided with grooves or recesses 9 formed in its peripheral face which alternately establishes communication between one engine cylinder and the admission and exhaust ports formed in the valve casing. This however forms no part of the present invention, which relates primarily to connecting the separate sections 5 together to form an organized valve. Each section 5 is provided at one end with a coupling member 11, so constructed that it coöperates with a coupling ring 12 in locking the section, upon which it is mounted to the next adjacent section. Each coupling member 11 is adapted to be set into one end of one of the sections 5 and is provided with a pair of lugs 13 which are adapted to engage coöperating lugs 14 formed on the coöperating coupling disk or ring 12.

Each coupling member is formed in two diameters, and the external diameter of the smaller portion is such that the smaller portion may be inserted into the interior of the tubular section 5. The receiving end of the tubular section is counterbored to receive the portion of larger diameter of the coupling member and the counterbored portion is of such depth that it produces an annular extension or flange 15 which, when the member 11 is in place, overhangs it by an amount equal to substantially half the width of the ring 12. The member 11 may be secured to the section by any suitable means such as for example, pins 16.

In assembling the valve the adjacent ends of the different sections are each provided with a coupling member 11 and the rings 12 are located between the coupling members so that they lock the adjacent sections against relative rotary motion but permit axial annular motion. The overhanging flanges 15 of the adjacent sections coöperate to incase the ring 12 and consequently produce a substantially unbroken bearing face for the valve. One of the advantages of this construction is that the ring 12 does not engage relatively rotating faces and there is nothing on the surface of the assembled valve to cut or groove the bearing faces of the valve casing.

In the illustrated embodiment of my invention I have shown a valve formed of two end sections 5 and one intermediate section 5. The intermediate section is provided with a coupling member at each end while each of the end sections is provided with one coupling member only. Any suitable means may be employed for holding the valve in place within the casing but as illustrated I have provided at one end a stationary abutment 17 and at the other end an adjustable thrust bearing 18 screwed into the casing and adapted to engage a shoulder formed on the valve. As illustrated the valve is provided with a rotating gear 19 and is adapted to receive cooling liquid at one end from a port 20 formed in the casing and to deliver it from the other end.

In accordance with the United States patent statutes I have illustrated and described what I now believe to be the preferred embodiment of my invention, but I desire it to be understood that various changes, modifications, substitutions, additions and omissions may be made in the structure illustrated without departing from the spirit and scope of my invention.

What I claim is:

1. An articulate valve comprising at least two sections, each section having longitudinally projecting annular flanges formed on the end adjacent to the adjacent section, and a coupling ring shaped member located between adjacent sections of the valve and surrounded by said annular flanges.

2. An articular valve, comprising hollow cylindrical sections, each section having a projecting flange on the end adjacent to the next section, and a coupling ring for coupling adjacent sections surrounded by the projecting flanges of the sections coupled and forming with the sections a continuous passage through the valve.

3. A rotary valve comprising separate cylindrical sections, each section having a longitudinally projecting flange formed on one end thereof, and a coupling ring located between adjacent sections for positively locking said sections against relative rotary motion but for permitting said sections to rotate with their axes out of alinement, said coupling ring being surrounded by the projecting flanges of the coupled sections.

4. A rotary valve comprising separate sections, each section having a projecting flange and axially projecting lugs at one end thereof, said lugs being surrounded by said flange, and a coupling located between adjacent sections, surrounded by the flanges thereof and having axially projecting lugs formed on opposite sides thereof for engaging the lugs of the coupled sections.

5. In an articulate valve, a section provided at one end with coupling lugs and having a projecting flange which overhangs said lugs, and a coupling ring of less diameter than the external diameter of the section for engaging said coupling lugs.

6. An articulate valve comprising separate cylindrical sections having peripheral edges, and a coupling member between adjacent sections and so located that the peripheral edges of the coupled sections project past the member and into close proximity with each other.

7. An articulate valve comprising separate cylindrical sections, each section provided at one end at least with coupling lugs and having a longitudinally projecting flange overhanging the lugs, and a floating ring, located between adjacent sections, and surrounded by the flanges of the sections, for engaging the coupling lugs of the sections and for coupling the sections together.

8. In an articulate valve, cylindrical sections, each section being recessed at one end at least to receive a coupling ring, and a coupling ring located in the recessed ends of adjacent sections.

9. In an articulate valve, cylindrical sections, each section being recessed at one end to receive a coupling, a coupling member located in one end of each section and rigidly secured thereto, and a coupling ring coöperating with said members in coupling the sections together, located within the recessed ends of the coupled sections.

In testimony whereof, I have hereunto subscribed my name this 27th day of May, 1914.

JOHN R. WINKLE.

Witnesses:
C. W. McGhee,
E. W. McCallister.